United States Patent
Mendoza Vera et al.

(10) Patent No.: US 9,561,753 B1
(45) Date of Patent: Feb. 7, 2017

(54) CONSOLE BIN ASSEMBLY WITH A REMOVABLE TRAY

(71) Applicant: FORD GLOBAL TECHNOLOGIES, LLC, Dearborn, MI (US)

(72) Inventors: Omar Mendoza Vera, Tlalnepantla (MX); Maria Fernanda Medina Luna, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/887,942

(22) Filed: Oct. 20, 2015

(51) Int. Cl.
*B60R 11/06* (2006.01)
*B60R 7/04* (2006.01)

(52) U.S. Cl.
CPC ..................... *B60R 7/04* (2013.01)

(58) Field of Classification Search
CPC .... B60R 7/04; B60R 2011/0007; B60R 11/00; B60R 2011/0075; B60N 2/4686; B60Q 3/022
USPC ... 296/37.8, 24.34, 37.1, 37.16; 297/188.19; 220/813; 224/282, 926, 281, 539
See application file for complete search history.

(56) References Cited

U.S. PATENT DOCUMENTS

| | | | | |
|---|---|---|---|---|
| 5,397,160 A * | 3/1995 | Landry | ...................... | B60R 7/04 224/539 |
| 5,520,313 A * | 5/1996 | Toshihide | ............ | B60N 2/4686 220/815 |
| 5,524,958 A * | 6/1996 | Wieczorek | ............... | A47C 7/70 297/188.17 |
| 5,527,008 A * | 6/1996 | Schutter | ................. | B60N 3/106 224/926 |
| 5,845,965 A * | 12/1998 | Heath | .................. | B60N 2/4646 297/188.14 |
| 5,848,820 A * | 12/1998 | Hecht | ................... | B60N 2/3013 297/113 |
| 5,863,089 A * | 1/1999 | Ignarra | ................... | B60N 3/102 224/926 |
| 6,032,027 A | 2/2000 | Loza et al. | | |
| 6,065,729 A * | 5/2000 | Anderson | ............. | B60N 3/102 224/282 |
| 6,135,528 A * | 10/2000 | Sobieski | .................. | B60R 7/04 224/311 |
| 6,682,116 B1 | 1/2004 | Okumura | | |
| 7,278,681 B2 | 10/2007 | Lilov et al. | | |
| 7,380,852 B2 * | 6/2008 | Vander Kuyl | ............ | B60R 7/04 296/24.34 |

(Continued)

FOREIGN PATENT DOCUMENTS

JP      H072151333 A      8/1995

OTHER PUBLICATIONS

English machine translation of JPH07215133A.

*Primary Examiner* — Kiran B Patel
(74) *Attorney, Agent, or Firm* — Vichit Chea; King & Schickli, PLLC

(57) ABSTRACT

A console bin assembly is provided for a motor vehicle. That console bin assembly includes a housing defining a storage compartment. Opposed channels are carried on the housing. Each of the opposed channels has an open end. In addition, the console bin assembly includes a tray including opposed projections that are received in the opposed channels. As a consequence, the tray may be stably secured in a storage position, flipped to increase access to the lower region of the storage compartment or fully removed from the storage compartment and console bin assembly if desired.

17 Claims, 5 Drawing Sheets

(56) References Cited

U.S. PATENT DOCUMENTS

| | | | |
|---|---|---|---|
| 8,714,613 B1 | 5/2014 | Gillis et al. | |
| 9,073,494 B1* | 7/2015 | Clark | B60R 7/082 |
| 2001/0047126 A1* | 11/2001 | Nagai | A61B 5/02055 |
| | | | 600/300 |
| 2002/0089217 A1* | 7/2002 | Scheerhorn | B60N 2/4646 |
| | | | 297/188.19 |
| 2003/0184133 A1* | 10/2003 | Mic | B60N 2/4646 |
| | | | 297/115 |
| 2004/0066053 A1* | 4/2004 | Fero | B60R 7/06 |
| | | | 296/37.8 |
| 2005/0145527 A1* | 7/2005 | Christensen | B25H 3/02 |
| | | | 206/500 |
| 2005/0224509 A1* | 10/2005 | Dry | B60N 3/107 |
| | | | 220/849 |
| 2006/0071497 A1 | 4/2006 | Radu et al. | |
| 2006/0085940 A1* | 4/2006 | Chernoff | A47L 5/24 |
| | | | 15/313 |
| 2007/0051764 A1* | 3/2007 | Sturt | B60R 7/04 |
| | | | 224/539 |
| 2007/0102945 A1* | 5/2007 | Mulvihill | B60R 7/04 |
| | | | 296/24.34 |
| 2007/0133217 A1* | 6/2007 | Tiesler | B60Q 3/022 |
| | | | 362/459 |
| 2007/0176449 A1* | 8/2007 | Kukucka | B60N 2/4646 |
| | | | 296/24.34 |
| 2007/0182184 A1* | 8/2007 | Lota | B42F 15/0094 |
| | | | 296/24.34 |
| 2007/0182187 A1* | 8/2007 | Lota | B60N 3/103 |
| | | | 296/37.8 |
| 2008/0048466 A1* | 2/2008 | Singh | B60N 3/08 |
| | | | 296/37.8 |
| 2008/0122241 A1* | 5/2008 | Blackmore | B60N 2/4686 |
| | | | 296/37.8 |
| 2009/0174236 A1* | 7/2009 | Lota | B60N 2/4606 |
| | | | 297/188.19 |
| 2009/0236810 A1* | 9/2009 | Anderson | B25H 3/00 |
| | | | 280/47.34 |
| 2010/0078954 A1* | 4/2010 | Liu | B60N 2/4686 |
| | | | 296/24.34 |
| 2011/0037287 A1* | 2/2011 | Penner | B60N 3/101 |
| | | | 296/37.8 |
| 2015/0102622 A1* | 4/2015 | Horst | B60R 5/045 |
| | | | 296/24.43 |
| 2016/0236604 A1* | 8/2016 | Parlow | B60N 3/103 |

* cited by examiner

CONSOLE BIN ASSEMBLY WITH A REMOVABLE TRAY

TECHNICAL FIELD

This document relates generally to the motor vehicle equipment field and, more particularly, to a console bin assembly incorporating a removable tray that allows more convenient access to items stored at the bottom of the storage compartment of the console bin assembly.

BACKGROUND

It is well known in the art to equip motor vehicles with one or more console bin assemblies in order to increase the availability of concealed storage for small items such as compact discs, electronic music devices, pencils, pens, sunglasses, wallets and the like. Such console bin assemblies typically incorporate an internal storage compartment and an access lid that may also function as an armrest.

In many motor vehicles, the storage compartment is relatively deep and, accordingly, the console bin assemblies often include a tray that rests across a portion of the storage compartment and provides additional, more accessible storage closer to the top of the storage compartment when the lid is opened.

While such a tray provides the indicated benefits, it should be appreciated that such a tray also reduces the visibility of items stored in the lower portion of the storage compartment below the tray. Further, when a user requires access to the lower compartment in order to reach items contained therein, a user needs to remove the tray or try to reach around the tray. The confined space and orientation of the storage bin and tray to the user makes this very difficult. Thus, neither solution is particularly convenient.

This document relates to a new and improved console bin assembly incorporating a tray that may be flipped while remaining in the bin in order to improve access to items stored below the tray or, alternatively, easily removed from the bin if desired. This adds another level of convenience for the user when using the storage compartment provided by the console bin assembly and, therefore, represents a significant advance in the art.

SUMMARY

In accordance with the purposes and benefits described herein, a console bin assembly is provided for a motor vehicle. That console bin assembly comprises a housing defining a storage compartment, opposed channels carried on the housing and a tray including opposed projections. More specifically, the opposed channels are carried in the housing and each channel of the opposed channels has an open end. The opposed projections are received in the opposed channels to hold the tray in a desired location within the storage compartment of the console bin assembly.

In one particularly useful embodiment, each channel is substantially L-shaped. The open end of each L-shaped channel is oriented upwardly. Further, each channel is formed by a rib projecting from a side wall of the housing. Further, each L-shaped channel includes a first leg and a second leg, where the first leg is longer than the second leg. In one embodiment, the second leg includes the open end. Further, the first leg is oriented in a substantially horizontal plane while the second leg is oriented in a substantially vertical plane.

In one possible embodiment, each projection of the opposed projections is formed by a rigid lug having a circular cross-section. The opposed projections and opposed channels cooperate so that the tray has three modes of operation including: (a) sliding adjustability along the first leg, (b) flipping in the first leg to allow better access to items stored in the region of the storage compartment under the tray and (c) being removed from the storage compartment by sliding out of the opposed L-shaped channels through the open ends of those channels.

In one possible embodiment, the tray includes a storage recess and opposed support wings for engaging support rails formed on the sidewalls of the housing. In one possible embodiment, the support rails are formed by upper edges of the sidewalls of the housing. In any of the embodiments, the support rails may include a point providing clearance for the opposed legs, allowing the tray to flip when the opposed projections are at the closed ends of the first legs of the channels.

In any of the embodiments, the console bin assembly may further include a hinged lid for closing the storage compartment. That hinged lid may be carried on the housing.

In accordance with an additional aspect, a method is provided of supporting a tray in a storage compartment of a console bin assembly. That method may be broadly described as comprising the step of supporting the tray in the storage compartment by means of opposed projections received in opposed channels wherein each channel of the opposed channels has one open end and one closed end.

The method may further include orienting the open ends of each of the opposed channels upwardly to allow easy removal of the tray from the storage compartment. Further, the method may include providing each channel with an L-shape. Still further, the method may include forming each channel by means of a rib projecting from a sidewall of the housing of the console bin assembly.

In the following description, there are shown and described several preferred embodiments of the console bin assembly. As it should be realized, the console bin assembly is capable of other, different embodiments and its several details are capable of modification in various, obvious aspects all without departing from the console bin assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the console bin assembly and together with the description serve to explain certain principles thereof. In the drawing figures.

Reference will now be made in detail to the present preferred embodiments of the console bin assembly, examples of which are illustrated in the accompanying drawing figures.

DETAILED DESCRIPTION

Figure 1:
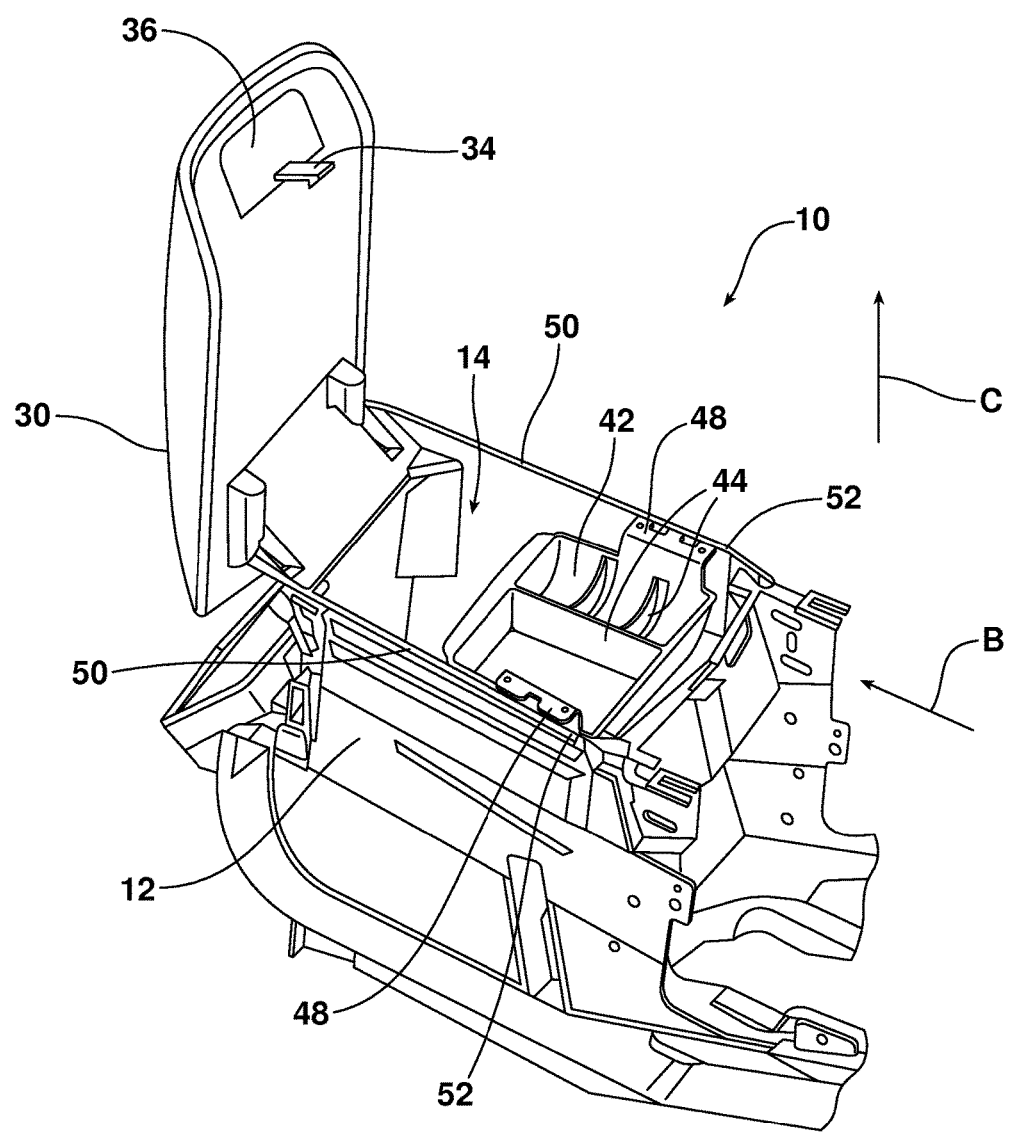
FIG. 1 is a perspective view from above illustrating the console bin assembly with the hinged lid in an open position and a tray supported at a forward end of the storage compartment.
Figure 2:
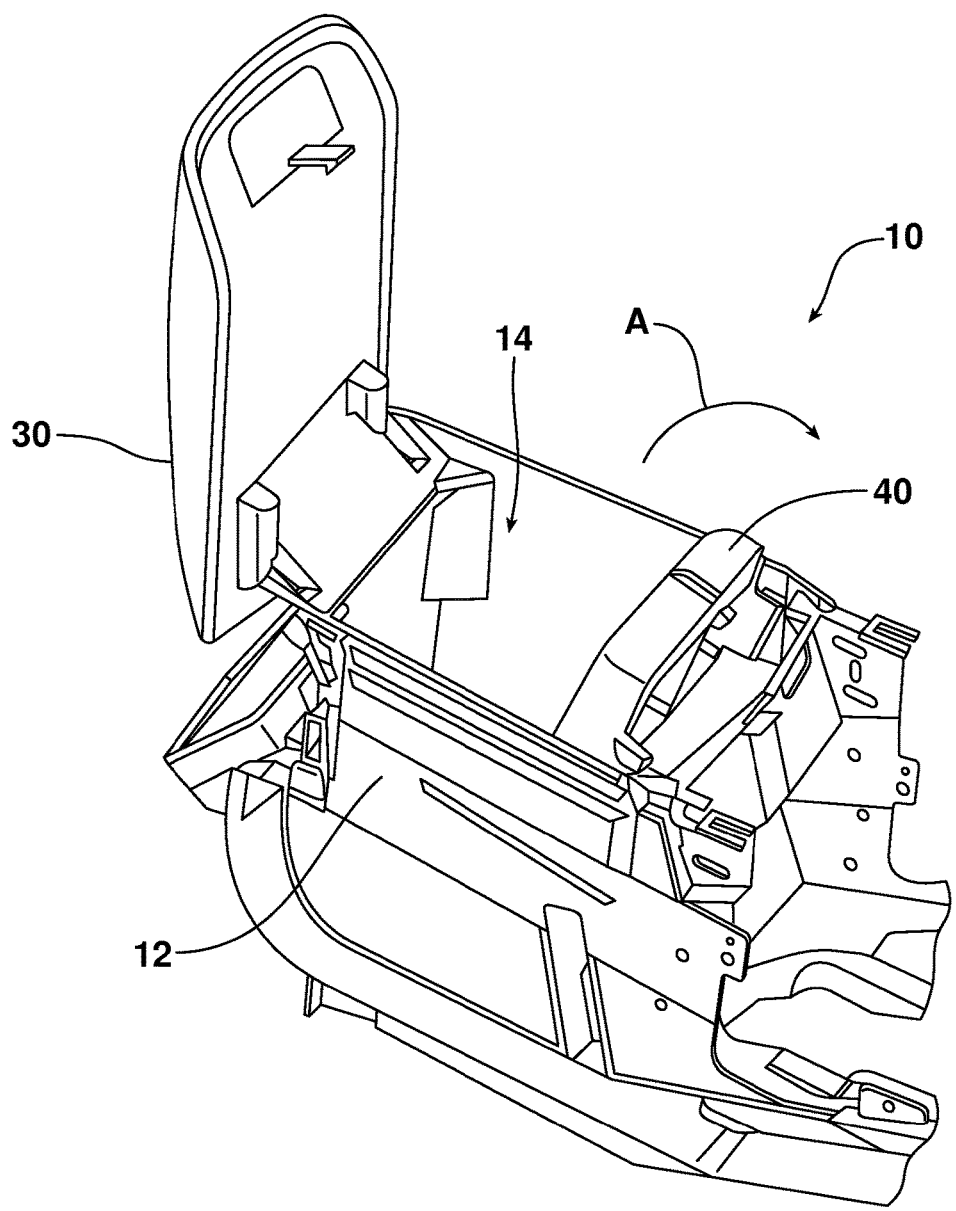
FIG. 2 is a view similar to FIG. 1, showing the tray flipped so as to provide better access to the lower portion of the storage compartment to allow a user to more readily reach items stored under the tray.
Figure 3:
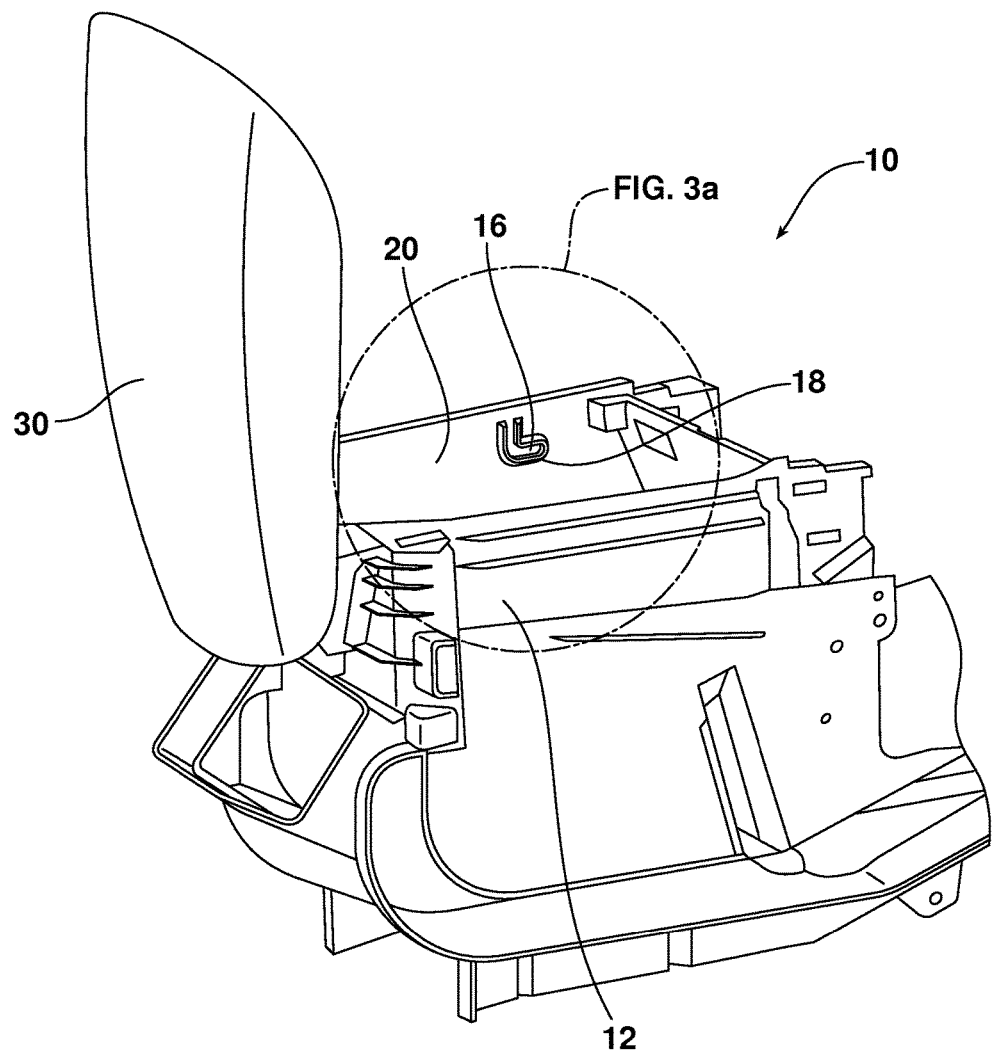
FIG. 3 is a perspective view illustrating the console bin assembly of FIGS. 1 and 2 with the tray removed to show the L-shaped channel carried on one side wall of the housing of the console bin assembly.
Figure 3A:
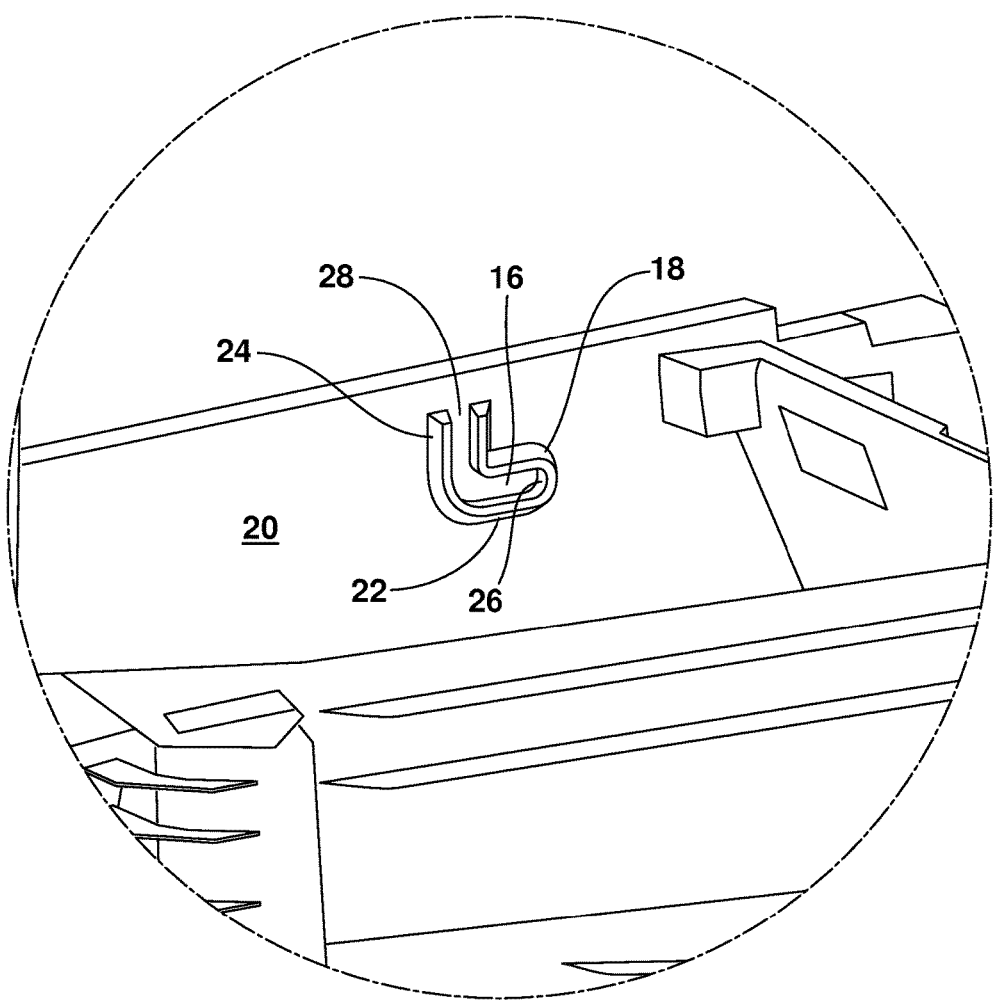
FIG. 3a is a detailed perspective view of the L-shaped channel shown in FIG. 3.

Reference is now made to FIGS. 1-4 illustrating the console bin assembly 10 that is adapted for use in a motor vehicle. In the illustrated embodiment, the console bin assembly 10 comprises a housing 12 that defines a storage compartment 14. Opposed channels 16 are carried on the housing 12. As best illustrated in FIGS. 3 and 3a, each channel 16 is formed by a rib 18 that projects from a sidewall 20 of the housing 12. In the illustrated embodiment, each channel 16 is L-shaped. Each channel 16 includes a first leg 22 and a second leg 24 such that the first leg is longer than the second leg. As illustrated, the first leg 22 includes a closed end 26 while the second leg 24 includes an open end 28. As should be appreciated, that open end 28 is oriented upwardly toward the open top of the storage compartment 14. Thus, the first leg 22 is oriented in a substantially horizontal plane while the second leg 24 is oriented in a substantially vertical plane.

A lid 30 is connected by means of a hinge 32 to the housing 12. In FIGS. 1-3, the lid 30 is illustrated in an open position. It should be appreciated that the lid 30 may be pivoted about the hinge to close the storage compartment 14. A latch 34 secures the lid 30 in a closed position while the actuator 36 may be used to release the latch 34, opening the lid 30.

Figure 4:
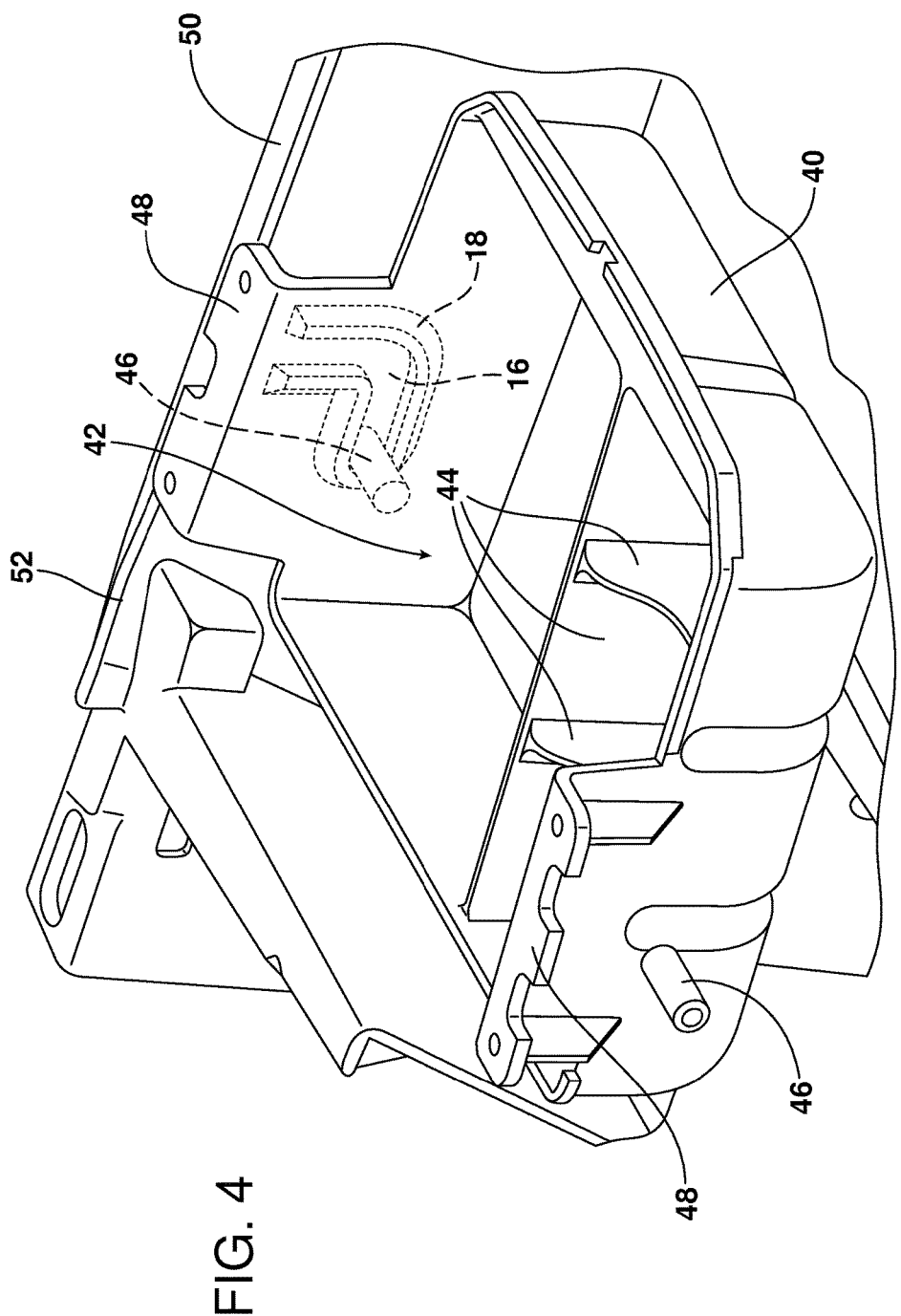
FIG. 4 is a detailed perspective view illustrating one of the projecting lugs on the tray that is received in the cooperating channel as well as a point on the opposite support rail providing clearance for one of the opposed wings, allowing the tray to be flipped when the opposed projections are at the closed end of the first leg of each L-shaped channel.

As further illustrated in FIGS. 1-4, the console bin assembly 10 also includes a tray 40. As best illustrated in FIG. 4, the tray 40 includes a storage recess 42 for holding small items. That storage recess 42 may be divided into individual compartments by a series of partitions 44 if desired.

The tray 40 also includes two opposed projections 46 and two opposed support wings 48.

When the tray 40 is positioned in a storage position within the storage compartment 14 of the console bin assembly 10, the opposed projections 46 are received and held in the opposed L-shaped channels 16 on the opposed sidewalls 20 of the housing 12. At the same time, the opposed support wings 48 rest upon the support rails 50 formed on the sidewalls 20 of the housing 12. In the illustrated embodiment, the support rails 50 are formed by the upper edges of those sidewalls. As should be appreciated, the engagement of the projections 46 in the channels 16 and the engagement of the support wings 48 with the support rails 50 ensures that the tray 40 is held in a stable storage position within the storage compartment 14 (see FIG. 1).

When a user desires to access the lower portion of the storage compartment 14 in order to stow or retrieve small items, the user may flip the tray 40 as illustrated in FIG. 2. More specifically, the projections 46 may take the form of rigid lugs that are circular in cross-section and will rotate freely once received in the closed ends 26 of the opposed channels 16. Accordingly, the tray 40 may be rotated and flipped in the direction of action arrow A. Here it should be appreciated that the points 52 at the forward end of the support rails 50 provide the necessary clearance for the opposed wings 48 on the tray 40 to flip, thereby allowing the movement illustrated in FIG. 2.

Of course, if a user desires to remove the tray 40 from the storage compartment 14, this may be easily accomplished. Specifically, the user may slide the tray 40 rearwardly so that the projections 46 pass along the first legs 22 from the closed ends 26 to the second leg (note action arrow B in FIG. 1). The tray 40 is then lifted upwardly in the direction of action arrow C so that the projections 46 pass through the second legs 24 and out of the upwardly-oriented open ends 28. Thus, the tray 40 may be easily removed from the storage compartment 14 as desired.

As should be further appreciated, a method is provided for supporting the tray 40 in a storage compartment 14 of a console bin assembly 10. That method may be broadly described as comprising the step of supporting the tray 40 in the storage compartment 14 by means of the opposed projections 46 that are received in the opposed channels 16 where each channel has an open end 28 and a closed end 26.

In one particularly useful embodiment, the method includes orienting the open ends 26 upwardly to allow easy removal of the tray 40 from the storage compartment 14 when desired. Further, the method includes providing each channel 16 with an L-shape. In addition, the method includes forming each channel 16 by means of a rib 18 projecting from a sidewall 20 of the housing 12.

In summary, the console bin assembly 10 provides a number of benefits. More specifically, the tray 40 of the console bin assembly 10 allows three separate modes of operation. These modes include sliding adjustability within the storage compartment: that is, the projections 46 slide smoothly along the first leg 22 of the opposed channels 16. As illustrated in FIGS. 1 and 2, the tray 40 may also be flipped with the projections 46 rotating in the closed ends 26 of the opposed channels 16. Finally, the tray 40 may be removed from the opposed L-shaped channels 16 through the open ends 28.

Advantageously, the flipping of the tray 40 significantly improves access to the lower region of the storage compartment 14 without removing the tray 40 from the console bin assembly 10. At the same time, the tray 40 may still be easily removed from the console bin assembly 10 if desired by aligning the projections 46 with the second legs 24 and then lifting the projections through the open ends 28. At all other times, the rigid projections or lugs 46 provide for stability and precise movement of the tray 40 through the channels 16 in the storage compartment 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A console bin assembly for a motor vehicle, comprising:
  a housing defining a storage compartment;
  opposed channels carried on said housing, each channel of said opposed channels having an open end; and
  a tray including opposed projections received in said opposed channels.

2. The console bin assembly of claim 1, wherein each channel is substantially L-shaped.

3. The console bin assembly of claim 2, wherein said open end of each L-shaped channel is oriented upwardly.

4. The console bin assembly of claim 3, wherein each L-shaped channel is formed by a rib projecting from a sidewall of said housing.

5. The console bin assembly of claim 4, wherein each projection of said opposed projections is formed by a rigid lug.

6. The console bin assembly of claim 5, wherein each L-shaped channel includes a first leg and a second leg.

7. The console bin assembly of claim 6, wherein said second leg includes said open end.

8. The console bin assembly of claim 7, wherein said first leg is oriented in a substantially horizontal plane and said second leg is oriented in a substantially vertical plane.

9. The console bin assembly of claim 8, wherein said tray has three modes of operation including (a) sliding adjustably along said first leg, (b) flipping on said first leg and (c) being removed from said opposed L-shaped channels through said open ends.

10. The console bin assembly of claim 9, wherein said tray includes a storage recess and opposed support wings for engaging support rails formed on said sidewalls of said housing.

11. The console bin assembly of claim 10, wherein said support rails are formed by upper edges of said sidewalls.

12. The console bin assembly of claim 11, wherein said support rails include a point providing clearance for passage of said oppose wings and allowing said tray to flip when said opposed projections are at a closed end of said first leg of each channel.

13. The console bin assembly of claim 12, further including a hinged lid for closing said storage compartment, said hinged lid being carried on said housing.

14. A method of supporting a tray on a storage compartment of a console bin assembly, comprising:

supporting said tray on said storage compartment by means of opposed projections received in opposed channels wherein each channel of said opposed channels has one open end and one closed end.

15. The method of claim 14, including orienting said open end upward to allow easy removal of said tray from said storage compartment.

16. The method of claim 14, including providing each channel with an L-shape.

17. The method of claim 16, including forming each channel by means of a rib projecting from a sidewall of a housing of said console bin assembly.

* * * * *